United States Patent [19]
Cox et al.

[11] Patent Number: 5,355,488
[45] Date of Patent: Oct. 11, 1994

[54] METHOD FOR ADAPTIVELY BUILDING A LIBRARY OF PROGRAM THREADS

[75] Inventors: Daryl R. Cox, Bedford; John T. Gabbard, Keller; Sally A. Zuponcic, Hurst, all of Tex.

[73] Assignee: International Business Machines Corporation, Armonk, N.Y.

[21] Appl. No.: 180,751

[22] Filed: Dec. 21, 1993

Related U.S. Application Data

[63] Continuation of Ser. No. 809,981, Dec. 18, 1991, abandoned.

[51] Int. Cl.$^5$ ............... G06F 9/30; G06F 9/38; G06F 9/46
[52] U.S. Cl. ............... 595/650; 395/700; 364/DIG. 1; 364/281.3; 364/281.7; 364/264.6; 364/230.3
[58] Field of Search ............... 395/650, 700

[56] References Cited

U.S. PATENT DOCUMENTS

| | | | |
|---|---|---|---|
| 4,463,420 | 7/1984 | Fletcher | 364/DIG. 1 |
| 4,658,351 | 4/1987 | Teng | 364/DIG. 1 |
| 4,897,780 | 1/1990 | Lakness | 364/DIG. 1 |
| 5,063,500 | 11/1991 | Shorter | 364/DIG. 1 |
| 5,097,533 | 3/1992 | Burger et al. | 395/500 |
| 5,201,049 | 4/1993 | Shorter | 395/650 |

*Primary Examiner*—Eddie P. Chan
*Attorney, Agent, or Firm*—Whitham, Curtis, Whitham & McGinn

[57] ABSTRACT

A method by which a task once set-up by the API is retained in an idle status after the task is complete. Set-up tasks are maintained in a pool. A task manager, in response to an application work request, initially searches the pool for an idle task (i.e., idle thread or process) corresponding to the task request. If there is a corresponding idle task in the pool, control passes to the application code for execution. If there is no idle task available, the Task Manager functions as an API and sets-up the task as in the prior art except that, when completed, it is not terminated but rather its identifier is placed in the pool.

1 Claim, 2 Drawing Sheets

METHOD FOR ADAPTIVELY BUILDING A LIBRARY OF PROGRAM THREADS

This application is a continuation of application Ser. No. 07/809,981, filed Dec. 18, 1991, now abandoned.

BACKGROUND OF THE INVENTION

1. Field of the Invention

The present invention generally relates to an improved method for starting application tasks in a multitasking operating system, and more particularly to an adaptive building method in which a task, once set-up and run, is saved in a set-up but idle state, forming a pool of available tasks.

2. Description of the Prior Art

As will be appreciated by those skilled in the art, in the OS/2 (a Trademark of IBM Corporation) multitasking operating system, application program requests are made to the operating system through an application program interface (API). A request starts a task; a task may be either a process, thread or session.

A thread identifies a dispatchable unit of work (a program runs within a thread). A process is a collection of one or more threads and associated system resources (such as memory, open files, and devices). A session is a collection of one or more processes associated with a virtual console (keyboard, video display, or mouse).

The basic unit of execution in OS/2 is the thread. Every process in the system has at least one thread. The thread provides program code with an execution environment that consists of the register values, stack, and the CPU mode as the thread's context. OS/2 automatically maintains the correct context for each thread. An application may employ one or more threads. For example, the application program reads from a diskette with one thread while it prints data with a second thread. Threads do not own system resources. Other than their own execution stacks, threads share the resources of the process. When all the threads of a process have ended, OS/2 terminates the process.

Program resources in OS/2 are grouped into logical units called processes. More precisely, a process is a collection of system resources allocated to a particular program. For example, the threads, memory, files, and devices created by a program all become part of the process.

Whenever OS/2 starts a program, it first creates a process to "own" the resources. OS/2 then loads the program and starts a thread to run the code. As the program allocates (or acquires) additional resources, they become part of the process. For example, memory segments, file, queues, semaphores, and threads are all resources a program may dynamically allocate.

Processes are created with the OS/2 DosExecPgm API. This API allows a caller to identify a program (EXE file) to be read in from disk and run as a process. If the program is already running, OS/2 creates a new process with a new execution instance of the code.

After a requested task has been set-up by the OS/2 API, control is passed to the application for execution. When control returns to the operating system, the task is terminated. FIG. 1 is a block diagram illustrating this prior art process.

The OS/2 operating system is described in detail in a publication entitled *OS/2 Programmer's Guide*, by Ed Iacobucci and published by Osborne McGraw-Hill, incorporated herein by reference.

While generally satisfactory, the OS/2 start-up process for a task is time consuming and can degrade overall system performance.

SUMMARY OF THE INVENTION

An object of this invention is the provision of a method that shortens the time required to set-up an application task.

Briefly, this invention contemplates a method by which a task, once set-up by the API, is retained in an idle state after the task is complete. Set-up tasks are maintained in a pool. A task manager, in response to an application work request, initially searches the pool for an idle task (i.e., idle thread or process) corresponding to the application work request. If there is a corresponding idle task in the pool, control passes to the application code for execution. If there is no idle task available, the Task Manager functions as an API and sets-up the task as in the prior art except that, when the application work is completed, the task is not terminated but rather its identifier is placed in the pool.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
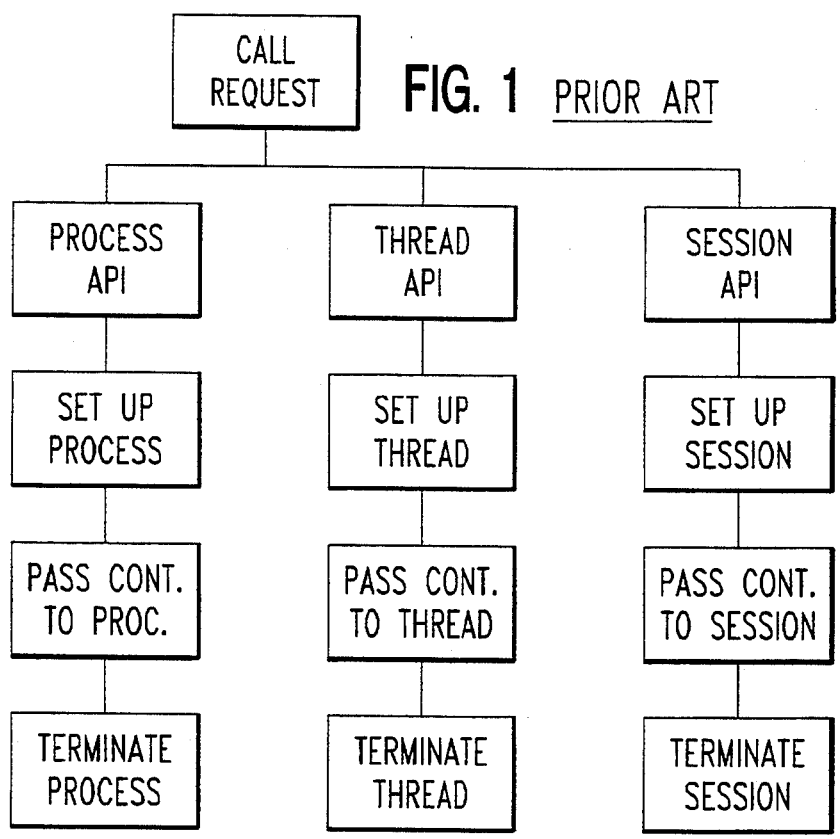
FIG. 1 is a block diagram of the prior art OS/2 system organization.
Figure 2:
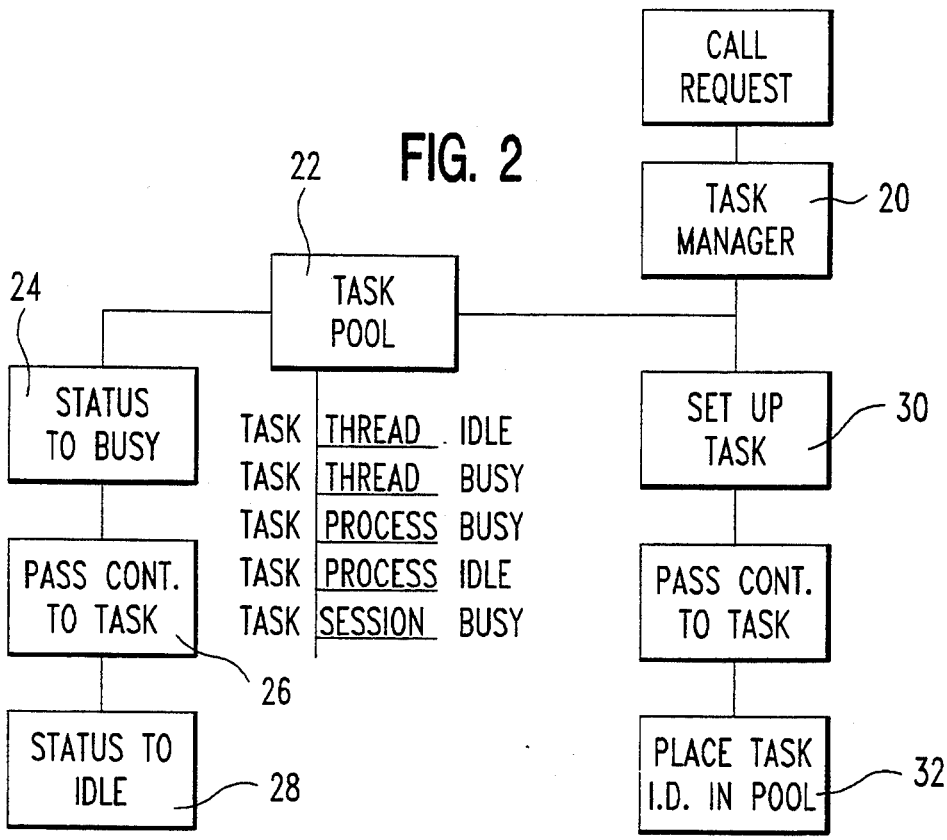
FIG. 2 is a block diagram of the overall organization in accordance with the teaching of this invention.

Referring now to FIG. 2, in accordance with this invention, tasks are not terminated when completed, but remain in a set-up, but idle state. An identifier identifying each set-up task (i.e., identifying whether the task is a process or thread) is placed in a pool 22 along with a state identifier identifying whether the task is idle or busy. A Task Manager 20 first searches the task pool 22 to determine if an application work request has a corresponding available task in the pool 22. If it does and if it is in an idle state, its state is changed to busy (block 24) and control is passed to the task application code (block 26). When the task is completed the identifier state is returned to idle (block 28), and the task remains in a set-up but idle state.

The Task Manager 20 also provides an API function to set-up a task (block 30) in the event a task type corresponding to a requested task is not in the pool 22 or it is in the pool but in a busy state. Here it should be noted that typically a task pool will have multiple incidences of a given type of task (thread or process) each with a unique identifier, as indicated in FIG. 2.

When the task is complete, its identifier is placed in the pool 22 and the task remains in a setup but idle state (block 32). In a preferred embodiment of the invention, there is no selection criteria for tasks entered in the pool, but there may be a limit on the total number of tasks entered. Here it should also be noted that, preferably, there is a separate pool for each type of task (i.e., process or thread) and in a given pool, idle tasks are used interchangeably. In general, the number of tasks in a given pool is a function of the frequency with which that type of task is called. Thus it will be appreciated that the building of a pool is a dynamic interactive process. There may be a Task Manager for each type of task, but preferably a single Task Manager serves all tasks.

Figure 3:
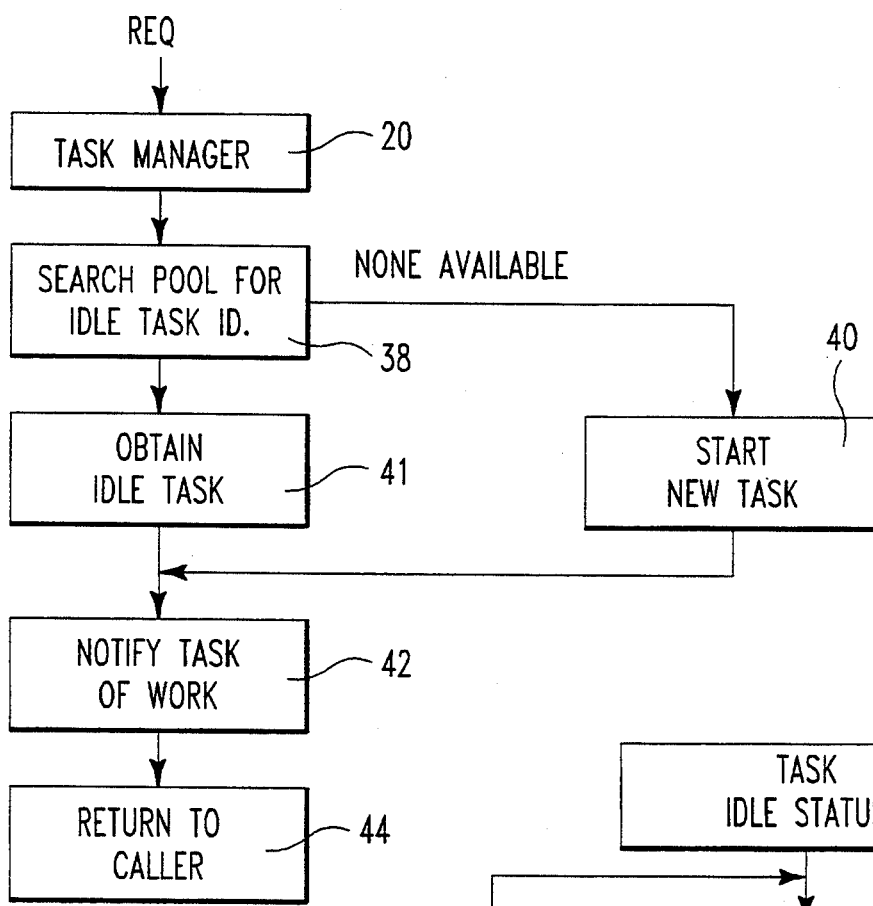
FIG. 3 is a flow diagram of the Task Manager operation.

Referring now to FIG. 3 in addition to FIG. 2, an application makes a request through the Task Manager 20. The request includes the task DLL and procedure name, task type and additional execution parameters. The Task Manager outputs the requested task identifier and a return code. Initially the Task Manager searches the pool 22 for a corresponding idle task identifier (block 38 of FIG. 3). If none is available, a new task is established, block 40. If available, the idle task is secured (block 41) and the parameters of the requested work are established in the task (block 42, which will be further explained in connection with FIG. 4). The Task Manager then returns the operation to the caller (block 44). In response to a synchronous request, the Task Manager will wait for completion of the application work request before returning to the caller.

Figure 4:
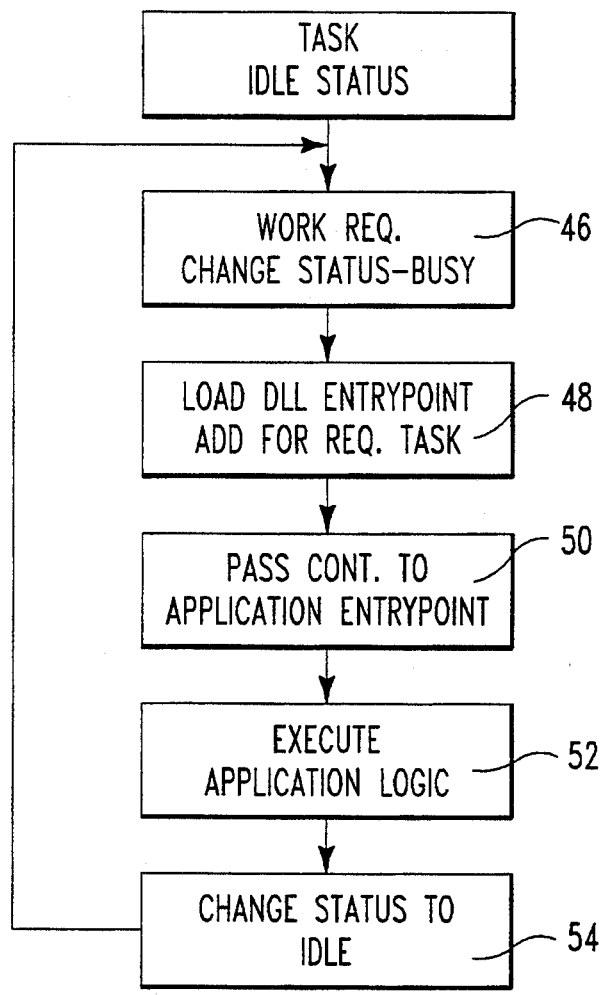
FIG. 4 is a flow diagram of the Task Pool operation.

Referring now to FIG. 4, when an idle task in the pool 22 corresponds to the work request from the Task Manager 20, in response to the request the state of the task is changed to busy (block 46). The Task Manager loads the DLL for the requested task and obtains the entry point address for the requested procedure (block 48). Control is then passed to the application entry point in block 50 and the logic of the application is executed, block 52. When the task is completed, the state of the task is changed to idle, block 54. If requested the Task manager will provide notification that the task is completed.

While the invention has been described in terms of a single preferred embodiment, those skilled in the art will recognize that the invention can be practiced with modification within the spirit and scope of the appended claims.

What is claimed is:

1. A computer implemented method for building in a memory a library of program threads that specify an execution environment for an application program in response to a thread-type application program work request in a multi-tasking computer operating system in which the operating system establishes said program threads in response to said application program work request wherein each of said program threads has a respective identifier that identifies each program thread maintained in said memory and identifies a state of each program thread maintained in said memory as idle or busy; the method comprising the steps of:

searching said memory for an identifier of a corresponding idle program thread in response to said thread-type application program request;

constructing by means of an application program interface routine within the operating system, a corresponding program thread in response to said corresponding program thread not residing in said memory in an idle state;

storing said corresponding program thread, constructed in said previous constructing step in said memory, in an idle state with a respective identifier, after said application program work request has been executed by said computer;

executing said application program work request with said corresponding idle thread, stored in said memory when said searching step locates the corresponding idles thread; and repeating the steps of constructing and storing said thread and respective identifier, when said searching step fails to locate an idle program thread whereby said memory stores multiple copies of said corresponding program thread, depending upon the frequency with which said thread-type application work request is requested.

* * * * *